United States Patent
Iliev

(10) Patent No.: US 11,940,311 B2
(45) Date of Patent: Mar. 26, 2024

(54) METROLOGY MODULE ADAPTABLE FOR USE IN MULTIPLE GAS METERS

(71) Applicant: Itron Global SARL, Liberty Lake, WA (US)

(72) Inventor: George Iliev, Wissembourg (FR)

(73) Assignee: ITRON GLOBAL SARL, Liberty Lake, WA (US)

( * ) Notice: Subject to any disclaimer, the term of this patent is extended or adjusted under 35 U.S.C. 154(b) by 295 days.

(21) Appl. No.: 17/375,800

(22) Filed: Jul. 14, 2021

(65) Prior Publication Data
US 2023/0019356 A1   Jan. 19, 2023

(51) Int. Cl.
| | |
|---|---|
| *G01F 15/063* | (2022.01) |
| *G01F 15/00* | (2006.01) |
| *G01F 15/18* | (2006.01) |
| *G06F 13/38* | (2006.01) |

(52) U.S. Cl.
CPC ......... *G01F 15/063* (2013.01); *G01F 15/002* (2013.01); *G01F 15/007* (2013.01); *G01F 15/185* (2013.01); *G06F 13/385* (2013.01)

(58) Field of Classification Search
CPC .... G01F 15/063; G01F 15/002; G01F 15/007; G01F 15/185; G06F 13/385; G01D 3/024; G01D 21/00; G01D 2204/20; G01D 2204/22; G01D 2204/26; G01D 4/002
See application file for complete search history.

(56) References Cited

U.S. PATENT DOCUMENTS

| | | | |
|---|---|---|---|
| 5,934,304 A | * | 8/1999 | Peterson ............... G01F 15/185 73/201 |
| 6,332,348 B1 | | 12/2001 | Yelverton et al. |
| 6,538,040 B1 | * | 3/2003 | Okuda ............... B29C 44/3446 261/DIG. 26 |

(Continued)

FOREIGN PATENT DOCUMENTS

PL           235875 B1 *  11/2020

OTHER PUBLICATIONS

Honeywell American Meter AC-250 NXS System, Smart Gas Metering System, Honeywell Smart Energy, 2020 Honeywell International Inc., 4 pages.

(Continued)

*Primary Examiner* — Amine Benlagsir
(74) *Attorney, Agent, or Firm* — Lee & Hayes P.C.

(57) ABSTRACT

A gas meter control system is adapted for use in gas meters having a plurality of different sizes (e.g., ability to measure different flowrates and/or different gas volumes per billing cycle) and different functional capabilities. In an example, the gas meter control system is configured to recognize and identify a metrology unit, sensor(s), switch(es), valve(s), valve motor(s), and/or other device(s) within a gas meter. Having identified devices present within a gas-environment and an air-environment of the meter, the control system selects and executes appropriate software to operate the identified devices. Addition of an additional component to the meter (e.g., an earthquake sensor or a tamper sensor) results in identification of the added component and execution of appropriate control software. Accordingly, the gas meter control system replaces a number of control systems configured to operate a single specific meter and/or configuration.

20 Claims, 5 Drawing Sheets

(56) References Cited

U.S. PATENT DOCUMENTS

| | | | |
|---|---|---|---|
| 2005/0091335 A1* | 4/2005 | Tapia | G01D 4/004 |
| | | | 709/201 |
| 2011/0188452 A1 | 8/2011 | Borleske et al. | |
| 2013/0116952 A1* | 5/2013 | Chai | H04Q 9/00 |
| | | | 702/189 |
| 2018/0087943 A1 | 3/2018 | Iliev et al. | |
| 2019/0260204 A1* | 8/2019 | Koval | G06Q 30/0206 |
| 2021/0207074 A1* | 7/2021 | Dai | C10L 3/104 |
| 2022/0232400 A1* | 7/2022 | Chasko | H04W 12/06 |

OTHER PUBLICATIONS

The PCT Search Report and Written Opinion dated Oct. 13, 2022 for PCT application No. PCT/US2022/031646, 14 pages.
PL 235 875 BI (Inst Nafty I Gazo Panstwowy Inst Badawczy [PL]), Nov. 2, 2020 (Nov. 2, 2020), paragraphs [0003] , [0016], [0009]; claim 1 ; figure 1.

* cited by examiner

METROLOGY MODULE ADAPTABLE FOR USE IN MULTIPLE GAS METERS

BACKGROUND

Gas meters are evolving to include static metrology devices (as opposed to mechanical metrology devices, such as "bellows"). The new meters are more functional and provide more information than is possible using mechanical metrology devices. In examples, the new meters include sensors and safety features for earthquake detection, temperature measurement, pressure measurement, leak detection, flow volume measurement, gas shut-off and others.

A significant cost is associated with this advancement, particularly in that inclusion of multiple different subsets of multiple different sensors, controllers, valves, valve-motors, driver software, firmware, etc., can result in gas meters having many different configurations. Accordingly, improvements that provided for efficient management of available devices and functionality would reduce costs.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
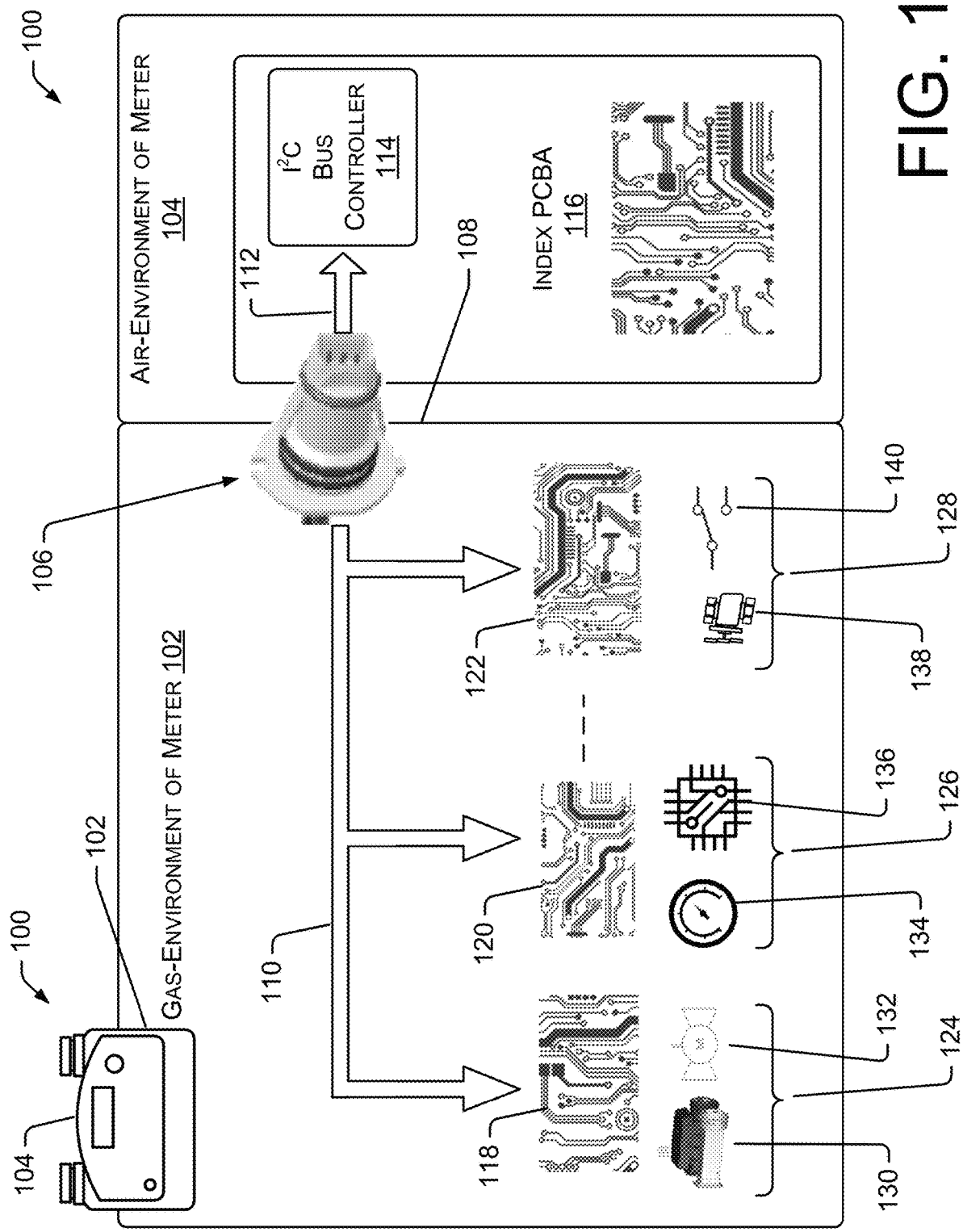
FIG. 1 is a diagram showing an example gas meter configured for use in a residential setting.

The disclosure describes a gas meter control system that is adapted for use in a plurality of different gas meters having a plurality of different gas flowrate measurement abilities, a plurality of different gas volume measurement abilities, and a plurality of different functional capabilities (e.g., sensors, shut-off valves, etc.). In an example, residential-type gas meters are not configured to measure the large gas flowrates measured by commercial-type gas meters. Additionally, commercial-type gas meters measure a greater range of flowrates (i.e., they have a greater flow range). In another example, some gas meters may have one or more functions (e.g., a function that sends a notification responsive to gas pressure over or under threshold values) that other gas meters do not have. Other functionality that may or may not be present in different gas meters includes earthquake detection, rapid gas shut-off valves, tamper detection, gas quality evaluation, temperature detection, atmospheric air pressure detection (measured by sensor(s) with access to the atmosphere outside the gas meter), etc. In these example gas meters, and many other example gas meters, the gas meter control system adapts to the hardware, software and/or firmware of the meter to provide needed control functionality. The adaptability of the control system allows the use of the control system in a wide variety of gas meters, and simplifies and/or reduces costs in the manufacturing process, the warehousing process, and the gas meter installation process. In a significant advantage, the control system also reduces the costs and time spent in regulatory applications, testing and approvals.

In an example gas meter, a gas-environment and an air-environment are present. The gas-environment includes an inlet and an outlet, but is otherwise sealed to prevent gas-leakage into the atmosphere and to prevent gas-leakage into the air-environment of the gas meter. The inlet receives gas from a utility provider and the outlet releases gas to a utility customer. A metrology device, such as a flowrate metrology sensor (FMU)—in one example, the FMU may be an ultrasonic metrology unit (UMU)—may be located at least in part in a gas-environment, within which gas (e.g., natural gas) is present. A metrology printed circuit board assembly (PCBA) may also be present within the gas-environment, and may communicate with, and control operations of, the FMU. In a typical gas-environment, a flow of gas through the gas-environment is measured by the FMU—which is interfaced to the metrology PCBA, which in turn may be controlled by an index PCBA in the air-environment—for gas metering and customer-billing purposes. Other devices may also be present in the gas-environment, such as valve(s), motor(s) to open/close the valve(s), pressure sensor(s), gas flow directing structures and/or flow conditioner(s) (e.g., to promote laminar gas flow), temperature sensor(s), tamper sensor(s), and/or other devices.

In an example gas meter, the air-environment of the gas meter is separated from the gas-environment of the gas meter. In the example, an index PCBA is located in the air-environment. The index PCBA is in communication with the metrology PCBA, sensors, valves and other devices, typically using wiring (e.g., an $I^2C$ bus) that passes between the air-environment and the gas-environment.

In an example of such wiring, the gas meter control system includes a bus pass-through connector that allows passage of a bus (e.g., an $I^2C$ bus) between the air-environment and the gas-environment. Accordingly, the $I^2C$ bus enables two-way communication between the index PCBA of the air-environment and the metrology PCBA of the gas-environment. In some examples, one or more metrology in gas (MIG) PCBAs are present in the gas-environment, and are also connected to the bus. The MIG PCBAs may control various devices in the gas-environment. The bus pass-through connector protects the $I^2C$ bus and power supply lines, and prevents gas leakage, in the area wherein the $I^2C$ bus passes through a portion of the enclosure between an air-environment and a gas-environment of the meter.

When installed in different gas meters, different portions of the available functionality of the index PCBA are used and are not used. In an example, software, firmware, and/or mixed-characteristic hardware/software device(s) may determine which functional modules, applications, programming commands, devices, etc., of the control system are needed to operate a particular gas meter. In an example, if a certain valve and valve-operating motor are found to be present, then appropriate software applications and/or driver software are selected and/or operated. If additional or alternative devices are present, then appropriate software applications driver software and/or commands are selected and/or operated. Additionally, inappropriate software applications, driver software, and/or other commands are not selected and not operated. Thus, the gas meter control system is adapted to control gas meters having a variety of different hardware devices and different control system needs. Accordingly, and in an example, the control system described herein comprises an index PCBA, bus pass-through device, a bus (e.g., an I²C bus) and a bus controller. The adaptability of the control system drastically reduces and/or eliminates the need for a number of alternative control systems, wiring harnesses and/or assemblies that might otherwise be designed, tested, approved, built, warehoused, installed, updated, and operated, etc.

Example Gas Meter and Control System

FIG. 1 shows an example gas meter 100 configured for use in a residential setting. The example gas meter is shown in the upper left of the figure, and represented in a more detailed functional block manner in the rest of the figure. The gas meter 100 includes a gas-environment 102 and an air-environment 104. A bus pass-through device 106 is installed in a hole defined in a wall 108 of the enclosure between the gas-environment 102 and the air-environment 104. In the example gas meter, the gas-environment is located in the lower portion 102 of the gas meter and the air-environment is located in the upper portion 104 of the gas meter.

In the example shown, the bus pass-through device 106 is configured to accommodate an I²C bus, having a gas-environment portion 110 of the bus and an air-environment portion 112 of the bus. In the example of an I²C bus, an I²C bus controller 114 may be part of an index PCBA 116 or otherwise located.

The index PCBA 116 is configured to control and/or communicate with a plurality of devices in both the gas- and/or air-environments. In the example shown, the index PCBA 116 communicates over the I²C bus 110, 112 with one or more metrology-in-gas (MIG) PCBAs 118, 120, 122. Each MIG PCBA 118, 120, 122 may control a respective group 124, 126, 128 of one or more devices. In the example shown, the MIG PCBA 118 controls and/or communicates with a metrology device 130 and an Earthquake sensor and shutdown valve 132. The MIG PCBA 120 controls or communicates with a sensor 134 and an electronic device, such as a surface mounted micro electrical mechanical system (MEMS) device 136. The MIG PCBA 122 controls and/or communicates with a motor-operated valve 138 and switching circuit 140.

Accordingly, the example gas meter control system includes the index PCBA 116, a bus pass-through device 106, an I²C bus having a gas-environment portion 110 and an air-environment portion 112, and an VC bus controller 114. In some examples of the gas meter control system, the index PCBA 116 will directly control the devices (e.g., valve(s), metrology unit(s), sensor(s), etc.) within the gas-environment. In other examples of the gas meter control system, the index PCBA 116 will additionally (or alternatively) control one or more of the MIG PCBAs 118, 120, 122, which may assist in the control of the valve(s), metrology unit(s), sensor(s), etc.

The gas meter control system—comprising the index PCBA 116, I²C bus, bus pass-through device 106, and I²C bus controller 114—is configured to discover and recognize different types of metrology units (e.g., FMUs), different types of sensors, different types of switches, different types of valves, different types of MIG PCBAs, and/or other devices that are present in the meter. Once such devices are discovered and recognized, the index PCBA 116 is configured to determine appropriate commands to control, support, operate, and/or provide other functionality as required by each device.

Figure 2:
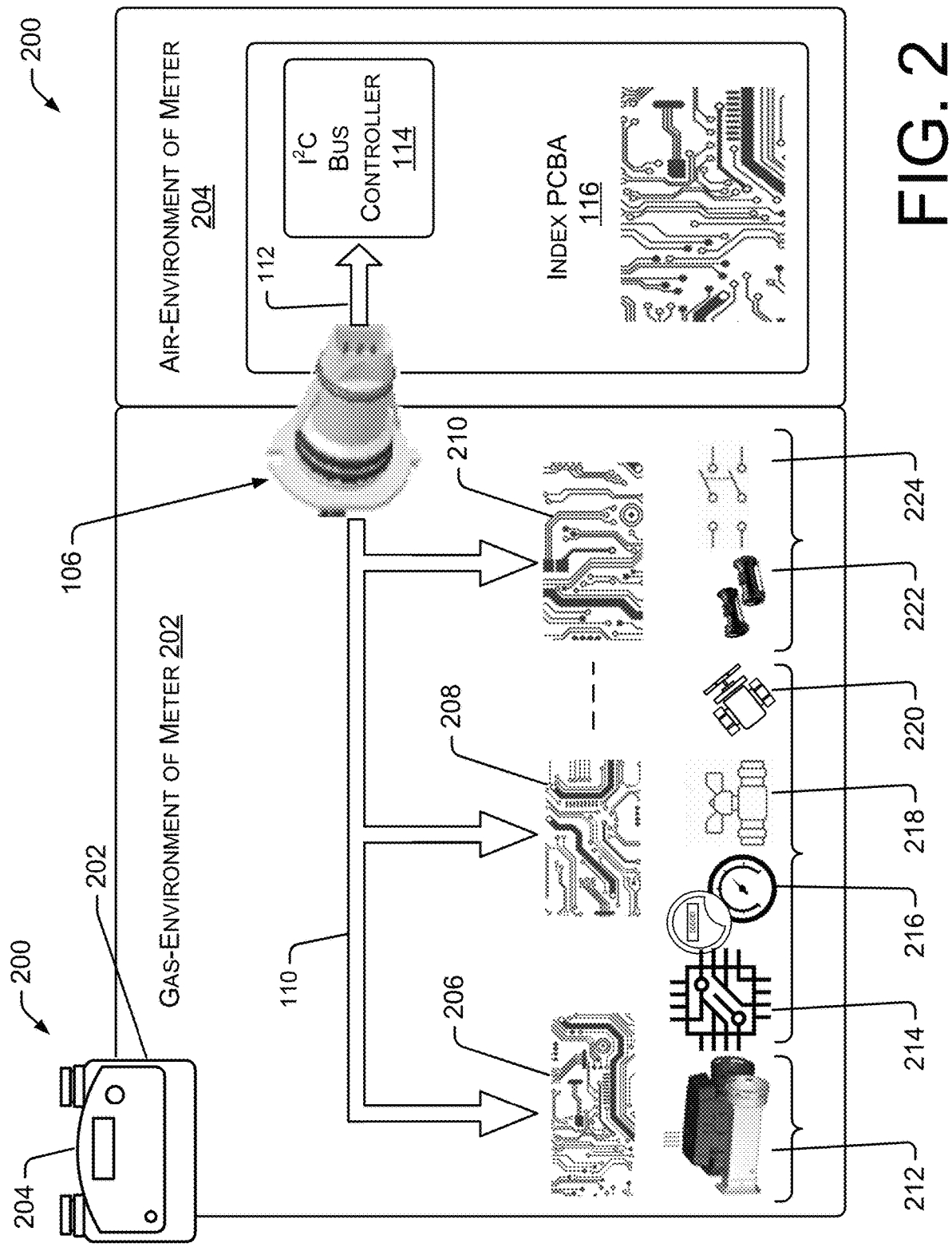
FIG. 2 is a diagram showing an example gas meter configured for use in a commercial setting.

FIG. 2 shows an example gas meter 200 configured for use in a commercial setting. Accordingly, the gas meter 200 is able to measure greater instantaneous gas flowrates and greater gas quantities over a time period than is possible using the gas meter 100 of FIG. 1. However, the gas meter control system comprising the index PCBA 116, the bus pass-through device 106, the I²C bus 110, 112 and I²C bus controller 114, is configured to be installed in either gas meter 100 or 200. Once installed in a gas meter, and upon operation, the control system discovers and recognizes different types of metrology units (e.g., FMU), sensor(s), valve(s), valve motor(s), device controller boards (e.g., MIG PCBAs), and/or other devices that are in the gas meter in which the control system is installed. Once discovered and recognized, the devices of the gas meter 200 are controlled by the index PCBA using the I²C bus and I²C bus controller.

In a first example, the devices 212-224 are discovered and recognized individually, and appropriate software is selected to operate the devices. In a second example, the meter in which the devices 212-224 are located is identified, which implies the existence of the devices 212-224, and appropriate software is selected to operate the devices.

In the example of FIG. 2, the gas meter control system—comprising the index PCBA 116, the bus pass-through device 106, the I²C bus 110, 112 and I²C bus controller 114—is installed in gas meter 200 in FIG. 2. Accordingly, the gas meter control system used in the gas meter 100 of FIG. 1 can also be used to control the gas meter 200 of FIG. 2. Gas meter 100 is sized and configured for residential use, while gas meter 200 is sized and configured for commercial use and is able to measure greater instantaneous gas flowrates and greater gas volumes per billing cycle than is possible with gas meter 100. However, in both cases, the gas meter control system is able to find, identify and control devices within the gas meter within which it is installed. In the example of FIG. 2, the index PCBA 116 discovers MIG PCBA controller cards 206, 208, 210 and a plurality of devices within the gas-environment. In the example shown, the devices include an FMU 212, electronics including micro electrical mechanical systems (MEMS) 214, sensors 216, valve 218, valve-operation motor 220, sensors 222, and switching circuits 224. Once recognized, the index PCBA 116 communicates with, and controls the operation of, the devices 206-224.

Two different gas meters (e.g., gas meter 100 of FIG. 1 and the gas meter 200 of FIG. 2) may include a number of components (e.g., MIG PCBAs, sensors, FMUs, valves, valve motors, etc.) that are different. Accordingly, when the index PCBA 116 is installed in one gas meter, different (or partially different) software of the index PCBA may be used than if the index PCBA was installed in a different type and/or differently-configured gas meter. However, by using the index PCBA 116 for installation in a variety of different gas meters, or differently configured gas meters, economies of manufacturing, warehousing, repair and field service, etc., are achieved. Additionally, if a gas meter is upgraded—such as by installation of a sensor or other device—the index PCBA may discover and recognize the new device, select appropriate software to operate it, and execute that software.

Example Methods

In some examples of the techniques discussed herein, the methods of operation may be performed by one or more application specific integrated circuits (ASIC) or may be performed by a general-purpose processor utilizing software defined in computer readable media. In an example, a general-purpose processor, ASIC or other device may be located in the index printed circuit board assembly (PCBA). In the examples and techniques discussed herein, memory device(s) of the index PCBA may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EE-PROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

The processing unit can include a processor and memory, an FPGA, ASIC, and/or one or more integrated circuits, and the instructions can be stored in memory or implemented in hardware circuits.

As defined herein, computer-readable media does not include transitory media, such as modulated data signals and carrier waves, and/or signals.

FIGS. 3-6 are flow diagrams showing example processes which are representative of techniques for use in manufacturing and operating gas meters using an index PCBA or control system adaptable for use in multiple gas meters of different types, models and/or configurations. The processes may, but need not necessarily, be implemented in whole or in part by the index PCBA 116, as described in FIGS. 1 and 2. Thus in one example, the index PCBA 116 and/or a control system comprising the index PCBA 116, the bus pass-through device 106, the I²C bus 110, 112 and I²C bus controller 114 could be used to implement the methods of FIGS. 3-6. In an alternative, a different control system could be used to perform the methods and techniques described with respect to FIGS. 3-6.

Figure 3:
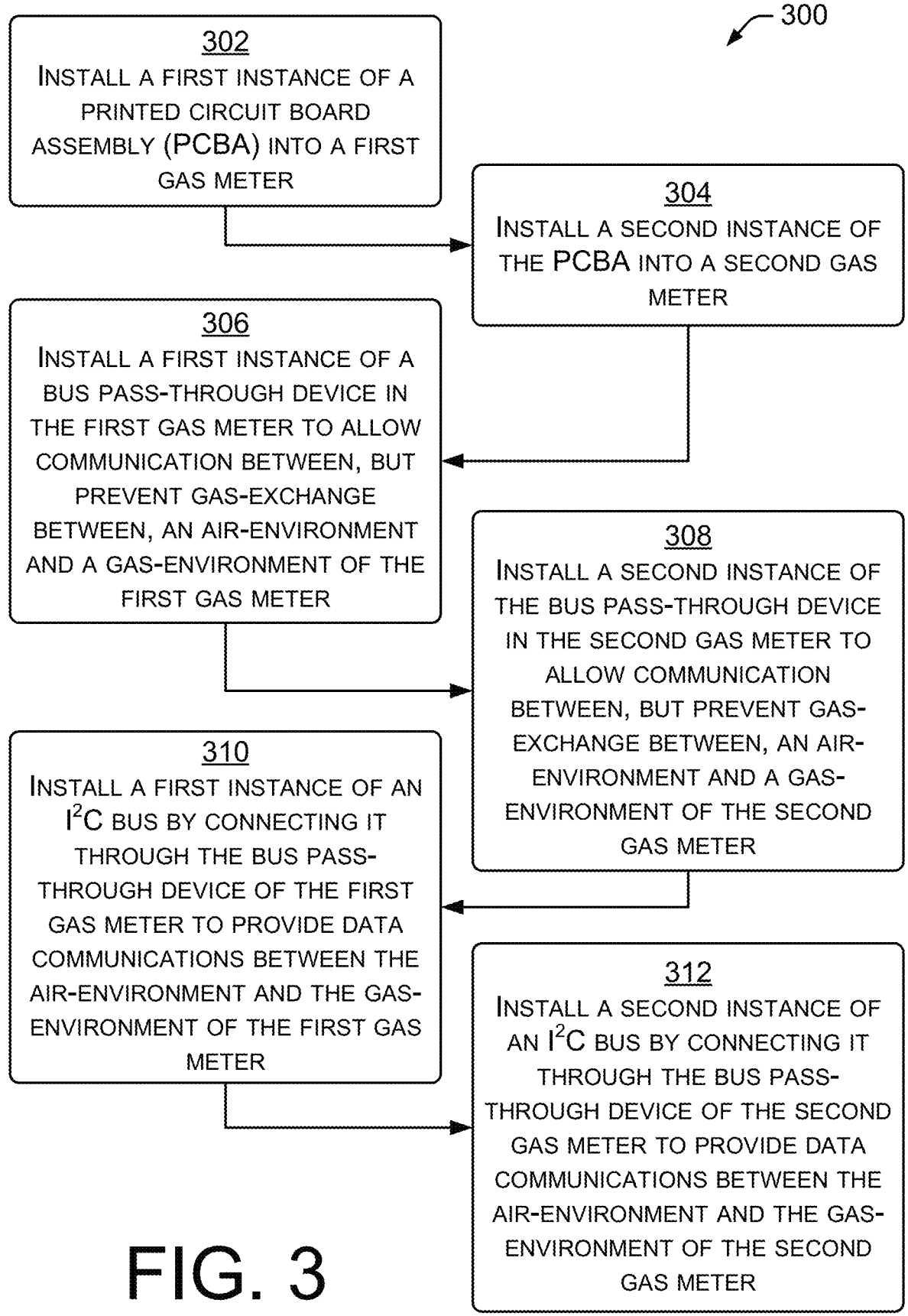
FIG. 3 is a flow diagram showing an example method for manufacturing and/or configuring smaller residential and larger commercial gas meters (the commercial gas meters being capable of measuring larger instantaneous gas flowrates and larger gas volumes per unit time than the smaller residential gas meters) using a single control system adapted for use in both manufacturing processes.

FIG. 3 is a flow diagram showing an example method 300 for manufacturing and/or configuring both smaller residential and larger commercial gas meters using a single type of control system. In an example, the method may be performed using the same index PCBA and/or the same control system comprising the index PCBA, a bus pass-through device 106, the I²C bus 110, 112 and I²C controller 114 in each gas meter. The manufacturing and/or configuring of the first and second gas meters could be performed simultaneously or sequentially, with either meter being manufactured and/or configured first.

At block 302, a first instance of a printed circuit board assembly (PCBA) may be installed into a first gas meter. At block 304, a second instance of the PCBA may be installed into a second gas meter. Accordingly, at blocks 302 and 304 two gas meters are constructed using the same type of PCBA. In an example, the PCBA is the index PCBA 116. Thus, the same type of index PCBA could be installed in each gas meter during the manufacturing process of two gas meters that are different, e.g., one gas meter being able to measure greater gas flowrates and greater gas volume per unit time than the other gas meter. In the example, the PCBA comprises a processor, a memory device in communication with the processor, and commands stored in the memory device. The commands or programming statements may include first commands stored on the memory device and accessible by the processor to operate a first metrology device of the first gas meter. The commands also include second commands stored on the memory device and accessible by the processor to operate a second metrology device of the second gas meter. In some examples, while the first and second commands are not identical, there is some overlap between the commands included in the first commands and second commands. In the example, the second gas meter is configured to measure gas flows and/or gas volumes in a unit time that are greater than can be measured by the first gas meter. Also, at least some of the first commands and the second commands are operated in a mutually exclusive manner. For example, the index PCBA of each gas meter would execute the commands that were appropriate for the type of metrology unit installed in that gas meter, and would not execute commands that were not appropriate for that gas meter.

At block 306, a first instance of a bus pass-through device may be installed in the first gas meter to allow communication between, but prevent gas-exchange between, an air-environment and a gas-environment of the first gas meter. At block 308, a second instance of the bus pass-through device may be installed in the second gas meter to allow communication between, but prevent gas-exchange between, an air-environment and a gas-environment of the second gas meter. In an example, while the enclosures of the first gas meter and the second gas meter may be different (e.g., one may be larger than the other), the same type bus pass-through device may be used in each gas meter to allow a bus to connect (for communication) devices located in the air-environment and the gas-environment. However, the bus pass-through device prevents gas-exchange between the gas-environment and the air-environment. Accordingly, gas cannot enter the air-environment and air cannot enter the gas-environment.

At block 310, a first instance of an I²C bus may be installed by connecting it to and/or through the bus pass-through device of the first gas meter to provide data communications between the air-environment and the gas-environment of the first gas meter. At block 312, a second instance of an I²C bus may be installed by connecting it to and/or through the bus pass-through device of the second gas meter to provide data communications between the air-environment and the gas-environment of the second gas meter. In an example, each bus pass-through device may allow the bus to pass through the bus pass-through device. In another example, each bus pass-through device may allow segments of the bus used in respective air-environment and gas-environments to connect to the bus pass-through device, which provides electrical conductivity between the gas-environment and the air-environment.

Figure 4:
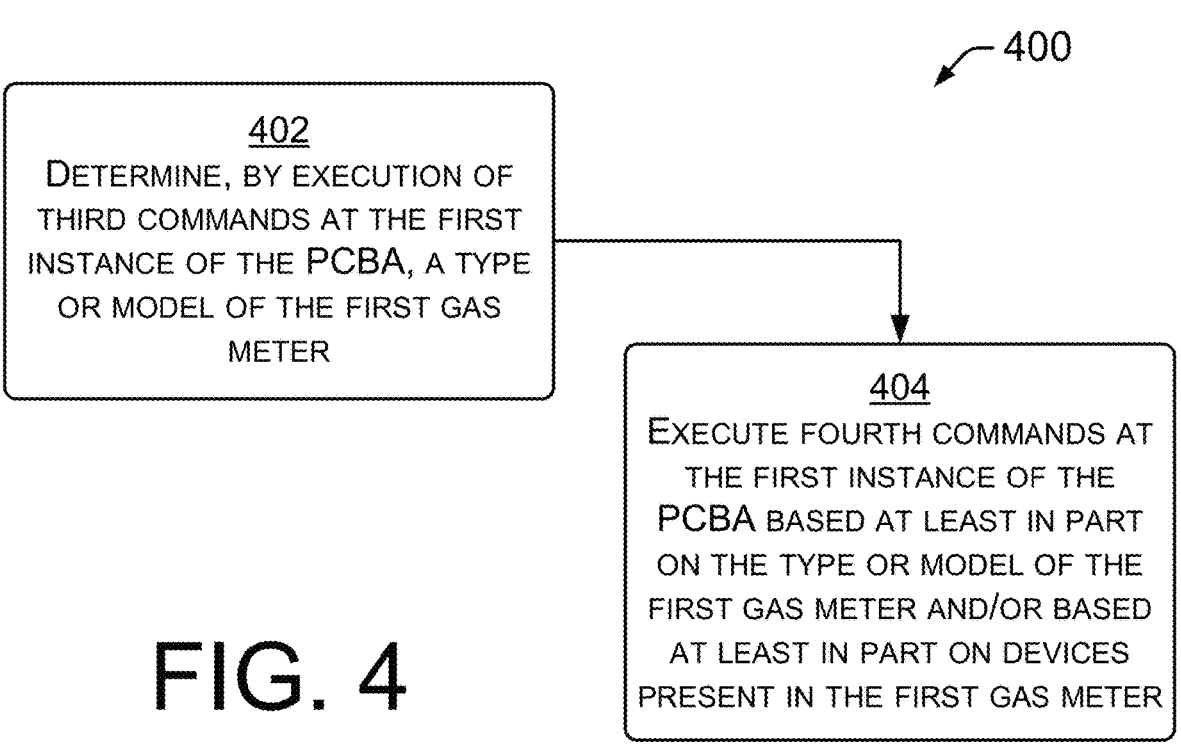
FIG. 4 is a flow diagram showing an example method for determining a type or model of gas meter in which a gas meter control system is installed and for identifying software and/or firmware appropriate to operate the determined gas meter and associated sensors, valves, devices, etc.

FIG. 4 shows an example method 400 for determining a type or model of gas meter in which a gas meter control system is installed. By determining a type, model or characteristics of a gas meter in which the control system is installed, the control system (e.g., the index PCBA) may utilize appropriate software to control devices known to be contained by the determined gas meter type or model. That is, the type or model of gas meter may indicate the components (e.g., sensors, valves, FMU, etc.) of the gas meter. In an example, having discovered the model, type, and/or characteristics of the gas meter, appropriate software to control and/or operate the metrology device (e.g., an FMU), one or more sensors, valves and/or valve motors, radio(s), consumption calculation and/or recording software, etc., may be identified and used.

At block 402, a type or model of the first gas meter may be determined. In an example, the type or model may be determined by execution of third commands (e.g., a third set of commands, a program or application, etc.) at the first instance of the PCBA. The commands may be executed by a processor of the index PCBA. In a first example, the commands may read a port or memory location that indicates the gas meter type, model, upgrade level, etc. In a second example, the commands may interrogate devices attached to the bus in the gas-environment and/or air-environment, and determine and/or identify of each such device (FMU, sensor, valve motor, etc.).

At block 404, based on the type of model of the first gas meter (discovered at block 402) appropriate commands are executed to control and operate the first gas meter. In an example, fourth commands are selected based on the type or model of the first meter. The fourth commands are executed at the first instance of the PCBA, which direct and/or control at least some aspects of the operation of devices of the first gas meter.

Figure 5:
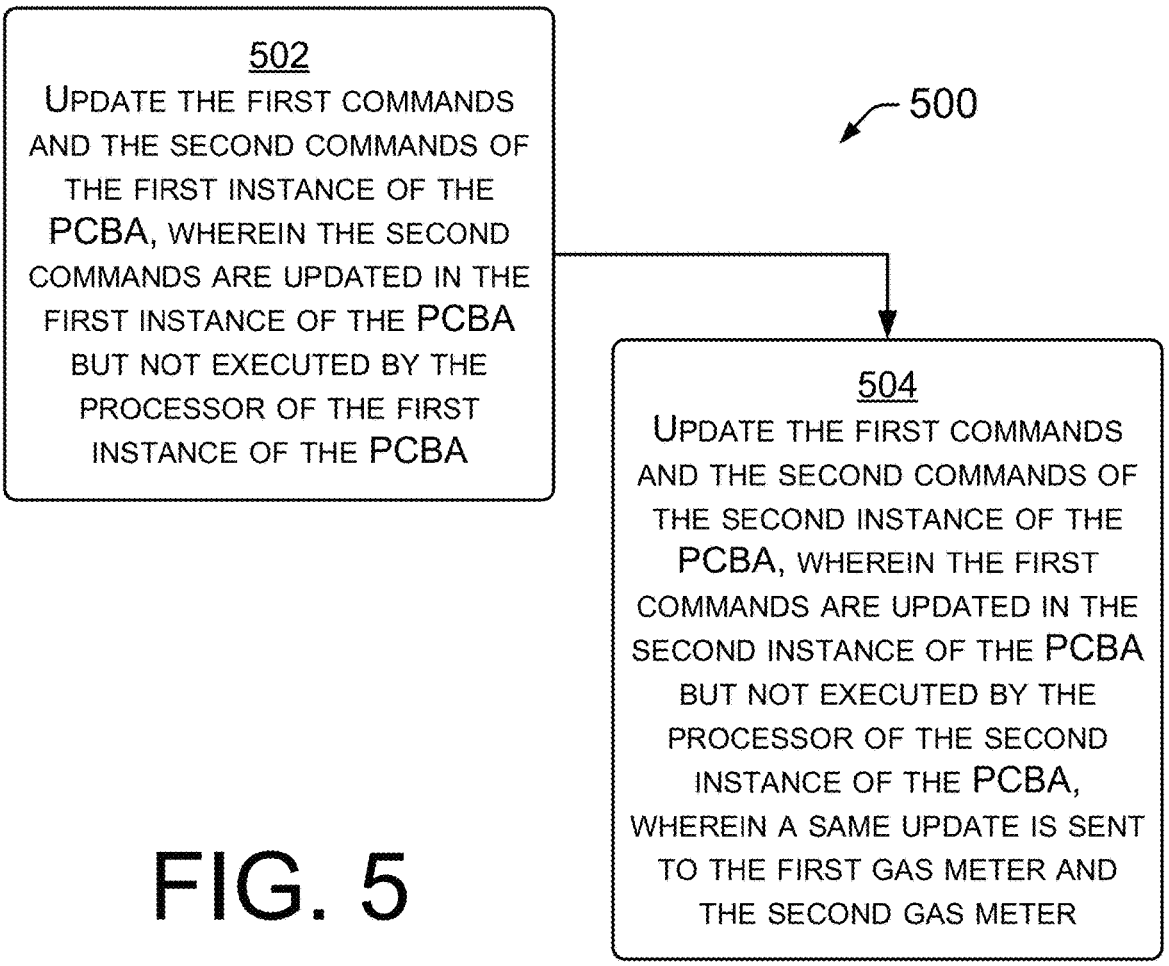
FIG. 5 is a flow diagram showing an example method for updating software and/or firmware used in a gas meter control system.

FIG. 5 shows an example method 500 for updating commands used in a gas meter control system (e.g., the index PCBA, bus pass-through device, data bus, and bus controller). In an example, commands (e.g., executable commands, software, firmware, computer instructions, etc.) defined in memory accessible by a processor of the index PCBA may be updated. The update may include only updates related to operation of devices of a particular gas meter that is controlled by the index PCBA. Alternatively, the update may include updates related to any gas meter that could be controlled by the index PCBA. In this alternative, commands that are not used by the index PCBA (since they are related to gas meter(s) not controlled by the index PCBA) may nevertheless be updated.

At block 502, the first and second commands (and/or any other commands) of the first instance (installed in the first gas meter) of the index PCBA may be updated. The first and second commands are configured to operate the first and second gas meters, respectively, as discussed with respect to FIG. 3. The first and second commands may (or may not) include some overlapping commands and/or functionality. Alternatively, only the first commands are updated in the first index PCBA.

At block 504, the first commands and the second commands (and/or any other commands) of the second instance (installed in the second gas meter) of the index PCBA may be updated. Alternatively, only the second commands are updated in the second index PCBA.

Figure 6:
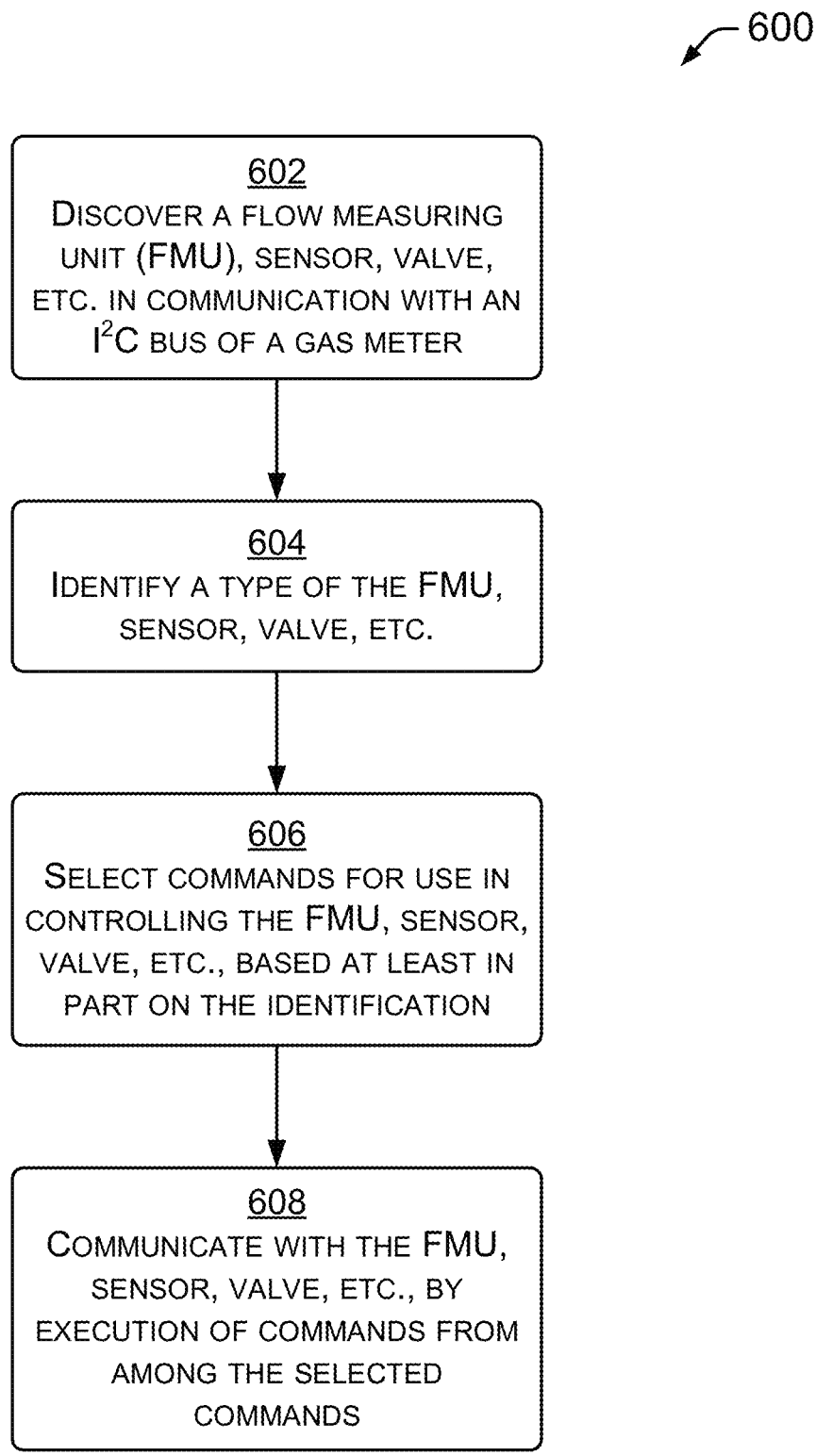
FIG. 6 is a flow diagram showing an example method for identifying sensors, switches, valves, motors and/or other devices in a gas meter, and for identifying appropriate commands for controlling such devices by operation of the gas meter control system.

FIG. 6 shows an example method 600 for identifying sensors, switches, valves, valve motors, and/or other devices in a gas meter. The method 600 may also identify commands (e.g., software) associated with, and designed for, controlling the devices that were identified, to thereby operate the gas meter. In contrast, aspects of FIG. 4 included recognizing a model of a gas meter, and deriving the devices present on the gas meter by referencing its model number.

At block 602, one or more metrology unit, sensor(s), switch(es), valve(s), valve motor(s), and/or other device(s) of a gas meter may be discovered. The device(s) may be in communication with an $I^2C$ bus of the first gas meter, in either the gas-environment or the air-environment. In an example, the device(s) may be connected to an $I^2C$ bus and may be discovered by operation of software on the index PCBA of the gas meter. In a further example, addition of an additional component to the meter (e.g., an earthquake sensor or a tamper sensor) results in identification of the added component and execution of appropriate control software.

At block 604, a type of the one or more metrology unit, sensor(s), switch(es), valve(s), valve motor(s), and/or other device(s) of a gas meter may be identified and/or determined. Following the discovery function of block 602, the identification process may be performed by the processor of the index PCBA, and may be made by interrogation of each device and/or any associated metrology in gas (MIG) PCBA in the gas-environment that is associated with the device. Thus, the type of device (e.g., device identity, device type, make and model) may be determined from the device itself and/or from any controller circuit of that device.

At block 606, commands for use in controlling the one or more metrology unit, sensor(s), switch(es), valve(s), valve motor(s), and/or other device(s) of a gas meter may be selected. The selection may be based at least in part on the discovery of block 602 and/or the identification of block 604.

At block 608, the index PCBA may communicate with, and direct operation of, the one or more metrology unit, sensor(s), switch(es), valve(s), valve motor(s), and/or other device(s) by execution of commands from among the selected commands.

Example Systems and Devices

The following examples of a metrology module, gas meter control system, and/or method of operation that is adaptable for use in multiple gas meters are expressed as number clauses. While the examples illustrate a number of possible configurations and techniques, they are not meant to be an exhaustive listing of the systems and/or methods described herein.

1. A gas meter control system, comprising: a printed circuit board assembly (PCBA), comprising: a processor; a memory device in communication with the processor; and commands stored in the memory device, comprising: first commands stored on the memory device and accessible by the processor to operate a first metrology device of a first gas meter; and second commands stored on the memory device and accessible by the processor to operate a second metrology device of a second gas meter, wherein the second gas meter is configured to measure gas flows that are greater than can be measured by the first gas meter, and wherein operation of the first commands and operation of the second commands is mutually exclusive; and a bus pass-through device, comprising: connectors for a bus; and a gas-tight seal to separate a gas-environment and an air-environment upon installation.

2. The gas meter control system of clause 1, additionally comprising: at least third commands and fourth commands to control respective at least two metrology in gas (MIG)

PCBAs within the gas-environment, wherein the at least third commands and fourth commands pass from the processor to the respective at least two MIG PCBAs over the bus, and wherein the bus is an I2C bus.

3. The gas meter control system of clause 1, additionally comprising: at least two sensor devices in communication with an I2C bus within the gas-environment; and at least third commands and fourth commands stored on the memory device, which when executed communicate respectively with the at least two sensor devices using the I2C bus.

4. The gas meter control system of clause 1, wherein the bus is an I2C bus, and wherein the I2C bus is configured to extend from the PCBA in the air-environment to a plurality of sensors contained in the gas-environment.

5. The gas meter control system of clause 1, wherein an I2C bus extends from the PCBA in the air-environment to a plurality of sensors contained in the gas-environment, and wherein the I2C bus is connected to the connectors for the bus of the bus pass-through device.

6. The gas meter control system of clause 1, additionally comprising: third commands stored in the memory device that determine, for each of a plurality of devices configured for use in the gas-environment, which devices are present and which devices are not present; and fourth commands stored in the memory device that: control devices that are present; and do not execute commands associated with devices that are not present.

7. The gas meter control system of clause 1, additionally comprising: third commands stored in the memory device that determine a type or model of meter in which the gas meter control system is installed; and fourth commands stored in the memory device that select commands for execution based at least in part on the type or model of meter.

8. The gas meter control system of clause 1, additionally comprising: third commands stored in the memory device that detect installation of an additional sensor; and fourth commands stored in the memory device that operate the additional sensor responsive to the detection.

9. The gas meter control system of clause 1, wherein commands are stored in the memory device to operate at least two of: a metrology device configured for H2 measurement; a metrology device configured for biogas measurement; and a metrology device configured for natural gas measurement.

10. The gas meter control system of clause 1, additionally comprising: third commands stored in the memory device that determine that updated commands are available; and fourth commands stored in the memory device that download and install the updated commands.

11. A method of manufacturing gas meters having at least two designs, the method comprising: installing a first instance of a printed circuit board assembly (PCBA) into a first gas meter, wherein the PCBA comprises: a processor; a memory device in communication with the processor; and commands stored in the memory device, comprising: first commands stored on the memory device and accessible by the processor to operate a first metrology device of the first gas meter; and second commands stored on the memory device and accessible by the processor to operate a second metrology device of a second gas meter, wherein the second gas meter is configured to measure gas flows that are greater than can be measured by the first gas meter, and wherein operation of the first commands and operation of the second commands is mutually exclusive; installing a second instance of the PCBA into the second gas meter; installing a first instance of a bus pass-through device in the first gas meter to allow communication between, but prevent gas-exchange between, an air-environment and a gas-environment of the first gas meter; and installing a second instance of the bus pass-through device in the second gas meter to allow communication between, but prevent gas-exchange between, an air-environment and a gas-environment of the second gas meter.

12. The method of clause 11, additionally comprising: installing a first instance of an I2C bus by connecting it through the bus pass-through device of the first gas meter to provide data communications between the air-environment and the gas-environment of the first gas meter; and installing a second instance of an I2C bus by connecting it through the bus pass-through device of the second gas meter to provide data communications between the air-environment and the gas-environment of the second gas meter.

13. The method of clause 11, additionally comprising: determining, by execution of third commands at the first instance of the PCBA, a type or model of the first gas meter, and executing fourth commands at the first instance of the PCBA based at least in part on the type or model of the first gas meter or based at least in part on devices present in the first gas meter.

14. The method of clause 11, additionally comprising: updating the first commands and the second commands of the first instance of the PCBA, wherein the second commands are updated in the first instance of the PCBA but not executed by the processor of the first instance of the PCBA; and updating the first commands and the second commands of the second instance of the PCBA, wherein the first commands are updated in the second instance of the PCBA but not executed by the processor of the second instance of the PCBA, wherein a same update is sent to the first gas meter and the second gas meter.

15. The method of clause 11, additionally comprising: discovering a sensor in communication with an I2C bus of the first gas meter; identifying a type of the sensor; selecting commands for use in controlling the sensor based at least in part on the identification; and communicating with the sensor by execution of commands from among the selected commands.

16. A gas meter, comprising: a first portion of an enclosure having an air-environment; a printed circuit board assembly (PCBA), within the first portion of the enclosure, the PCBA comprising: a processor; a memory device in communication with the processor; and commands stored in the memory device, comprising: first commands stored on the memory device and accessible by the processor to operate a first metrology device of a first gas meter; and second commands stored on the memory device and accessible by the processor to operate a second metrology device of a second gas meter, wherein operation of the first commands and operation of the second commands is mutually exclusive, and wherein the second gas meter is capable of measuring a greater gas flow than the first gas meter is capable of measuring; a second portion of the enclosure having a gas-environment; a metrology device, contained in the second portion, wherein the metrology device is one of the metrology device of the first gas meter or the metrology device of the second gas meter, and wherein the metrology device is operated responsive to one of: the first commands; or the second commands; and a bus pass-through device, comprising: connectors for an I2C bus; and a gas-tight seal to separate the air-environment from the gas-environment.

17. The gas meter of clause 16, additionally comprising: first and second sensor devices in communication with an I2C bus within the gas-environment; and third and fourth commands stored on the memory device, to communicate respectively with the first and second sensor devices using the I2C bus.

18. The gas meter of clause 16, wherein an I2C bus extends from the PCBA in the air-environment to connect to at least two sensors contained in the gas-environment.

19. The gas meter of clause 16, additionally comprising: third commands stored in the memory device that determine identities of devices that are present in the gas-environment; and fourth commands stored in the memory device that select commands for execution based at least in part on the determined identities of the devices that are present in the gas-environment.

20. The gas meter of clause 16, additionally comprising: third commands stored in the memory device that determine a type or model of the gas meter; and fourth commands stored in the memory device that select commands for execution based at least in part on the type or model.

21. The gas meter of clause 16, additionally comprising: commands stored in the memory device that detect installation of an additional sensor; and commands stored in the memory device that operate the additional sensor.

22. The gas meter of clause 16, additionally comprising: a thermal conductivity sensor connected to an I2C bus and located within the gas-environment; a pressure sensor connected to the I2C bus and located within the gas-environment; or a leak-detection sensor connected to the I2C bus and located within the gas-environment.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A gas meter control system, comprising:
a printed circuit board assembly (PCBA), comprising:
a processor;
a memory device in communication with the processor; and
commands stored in the memory device, comprising:
first commands stored in the memory device and accessible by the processor to operate a first metrology device of a first gas meter; and
second commands stored in the memory device and accessible by the processor to operate a second metrology device of a second gas meter, wherein the second gas meter is configured to measure gas flows that are greater than can be measured by the first gas meter;
third commands to recognize which one, between the first metrology device and the second metrology device, is in communication with the processor, thereby recognizing an available metrology unit; and
fourth commands for selecting and executing only one of the first commands or the second commands, wherein the selecting is based on a type of the available metrology unit recognized by the third commands; and
a bus pass-through device, comprising:
connectors for a bus; and
a gas-tight seal to separate a gas-environment and an air-environment upon installation.

2. The gas meter control system of claim 1, additionally comprising:
fifth commands and sixth commands to control respective at least two metrology in gas (MIG) PCBAs of a plurality of MIG PCBAs within the gas-environment, wherein the fifth commands and the sixth commands pass from the processor to the respective at least two MIG PCBAs over the bus, and wherein the bus is an I2C bus.

3. The gas meter control system of claim 1, additionally comprising:
at least two sensor devices of a plurality of sensor devices in communication with an I2C bus within the gas-environment; and
fifth commands and sixth commands stored in the memory device, which when executed communicate respectively with the at least two sensor devices using the I2C bus.

4. The gas meter control system of claim 1, wherein the bus is an I2C bus, and wherein the I2C bus is configured to extend from the PCBA in the air-environment to a plurality of sensors contained in the gas-environment.

5. The gas meter control system of claim 1, wherein an I2C bus extends from the PCBA in the air-environment to a plurality of sensors contained in the gas-environment, and wherein the I2C bus is connected to the connectors for the bus of the bus pass-through device.

6. The gas meter control system of claim 1, additionally comprising:
fifth commands stored in the memory device that determine, for each of a plurality of devices configured for use in the gas-environment, which of the plurality of devices are present and which of the plurality of devices are not present; and
sixth commands stored in the memory device that:
control first devices that are present in the plurality of devices; and
do not execute the fifth commands associated with second devices that are not present in the plurality of devices.

7. The gas meter control system of claim 1, additionally comprising:
fifth commands stored in the memory device that determine a type or a model of meter in which the gas meter control system is installed; and
sixth commands stored in the memory device that select the commands for execution based at least in part on the type or the model of the meter.

8. The gas meter control system of claim 1, additionally comprising:
fifth commands stored in the memory device for detecting installation of an additional sensor; and
sixth commands stored in the memory device that operate the additional sensor responsive to the detecting of the installation of the additional sensor.

9. The gas meter control system of claim 1, wherein the commands are stored in the memory device to operate at least two of:
a metrology device configured for H2 measurement;
a metrology device configured for biogas measurement; and
a metrology device configured for natural gas measurement.

10. The gas meter control system of claim 1, additionally comprising:
fifth commands stored in the memory device that determine that updated commands are available; and sixth commands stored in the memory device that download and install the updated commands.

11. A method of manufacturing gas meters having at least two designs, the method comprising:
installing a first instance of a printed circuit board assembly (PCBA) into a first gas meter, wherein the PCBA comprises:
a processor;
a memory device in communication with the processor; and
commands stored in the memory device, comprising:
first commands stored in the memory device and accessible by the processor to operate a first metrology device of the first gas meter;
second commands stored in the memory device and accessible by the processor to operate a second metrology device of a second gas meter, wherein the second gas meter is configured to measure gas flows that are greater than can be measured by the first gas meter;
third commands to recognize which one, between the first metrology device and the second metrology device, is in communication with the processor, thereby recognizing an available metrology unit; and
fourth commands for selecting and executing only one of the first commands or the second commands, wherein the selecting is based on a type of the available metrology unit recognized by the third commands;
installing a second instance of the PCBA into the second gas meter;
installing the first instance of a first bus pass-through device in the first gas meter to allow first data communications between, but prevent a first gas-exchange between, an air-environment and a gas-environment of the first gas meter; and
installing the second instance of a second bus pass-through device in the second gas meter to allow second data communications between, but a second prevent gas-exchange between, an air-environment and a gas-environment of the second gas meter.

12. The method of claim 11, additionally comprising:
installing the first instance of an I2C bus by connecting it through the first bus pass-through device of the first gas meter to provide the first data communications between the air-environment and the gas-environment of the first gas meter; and
installing the second instance of the I2C bus by connecting it through the second bus pass-through device of the second gas meter to provide the second data communications between the air-environment and the gas-environment of the second gas meter.

13. The method of claim 11, additionally comprising:
determining, by execution of fifth commands at the first instance of the PCBA, a type or a model of the first gas meter, and executing sixth commands at the first instance of the PCBA based at least in part on the type or the model of the first gas meter or based at least in part on devices present in the first gas meter.

14. The method of claim 11, additionally comprising:
updating the first commands and the second commands of the first instance of the PCBA, wherein the second commands are updated in the first instance of the PCBA but not executed by the processor of the first instance of the PCBA; and
updating the first commands and the second commands of the second instance of the PCBA, wherein the first commands are updated in the second instance of the PCBA but not executed by the processor of the second instance of the PCBA,
wherein a same update is sent to the first gas meter and the second gas meter.

15. The method of claim 11, additionally comprising:
discovering a sensor in communication with an I2C bus of the first gas meter;
identifying a type of the sensor;
selecting fifth commands of the commands, as selected commands, for use in controlling the sensor based at least in part on the identifying of the type of the sensor; and
communicating with the sensor by execution of the fifth commands as the selected commands.

16. A gas meter, comprising:
a first portion of an enclosure having an air-environment;
a printed circuit board assembly (PCBA), within the first portion of the enclosure, the PCBA comprising:
a processor;
a memory device in communication with the processor; and
commands stored in the memory device, comprising:
first commands stored in the memory device and accessible by the processor to operate a first metrology device of a first gas meter;
second commands stored in the memory device and accessible by the processor to operate a second metrology device of a second gas meter, wherein the second gas meter is capable of measuring a greater gas flow than the first gas meter is capable of measuring;
third commands to recognize which one, between the first metrology device and the second metrology device, is in communication with the processor, thereby recognizing an available metrology unit; and
fourth commands for selecting and executing only one of the first commands or the second commands, wherein the selecting is based on a type of the available metrology unit recognized by the third commands;
a second portion of the enclosure having a gas-environment;
a metrology device, contained in the second portion, wherein the metrology device is one of the first metrology device of the first gas meter or the second metrology device of the second gas meter; and
a bus pass-through device, comprising:
connectors for an I2C bus; and
a gas-tight seal to separate the air-environment from the gas-environment.

17. The gas meter of claim 16, additionally comprising:
first and second sensor devices in communication with the I2C bus within the gas-environment; and
fifth and sixth commands stored in the memory device, to communicate respectively with the first and second sensor devices using the I2C bus.

18. The gas meter of claim 16, wherein the I2C bus extends from the PCBA in the air-environment to connect to at least two sensor devices of a plurality of sensor devices contained in the gas-environment.

19. The gas meter of claim 16, additionally comprising:
fifth commands stored in the memory device that determine identities of devices that are present in the gas-environment; and
sixth commands stored in the memory device that select primary commands of the commands for execution based at least in part on the determined identities of the devices that are present in the gas-environment.

20. The gas meter of claim 16, additionally comprising:

fifth commands stored in the memory device that determine a type or model of the gas meter;

and sixth commands stored in the memory device that select primary commands of the commands for execution based at least in part on the type or model of the gas meter.

* * * * *